United States Patent
Paepke et al.

[11] 3,897,923
[45] Aug. 5, 1975

[54] CURVATURE MAINTAINING DEVICE

[75] Inventors: Bruce A. Paepke; Buddy J. Zent, both of Chardon, Ohio

[73] Assignee: Ball Corporation, Muncie, Ind.

[22] Filed: Dec. 13, 1971

[21] Appl. No.: 207,364

[52] U.S. Cl. .................. 248/75; 248/74 A; 248/79
[51] Int. Cl. ............................................. F16l 3/02
[58] Field of Search ............ 248/75, 76, 77, 78, 79, 248/74 A; 138/106, 173, 107, 110; 24/257 R

[56] References Cited
UNITED STATES PATENTS

| 955,342 | 4/1910 | Maxwell | 248/75 |
|---|---|---|---|
| 1,445,475 | 2/1923 | Berlow | 248/75 |
| 1,787,106 | 12/1930 | Glazener | 248/75 |
| 1,933,919 | 11/1933 | McPherson | 248/75 |
| 3,203,066 | 8/1965 | Lupoli | 24/257 R |
| 3,498,575 | 3/1970 | Downing | 248/74 R |

FOREIGN PATENTS OR APPLICATIONS

| 382,941 | 6/1922 | Germany | 138/110 |

*Primary Examiner*—Roy D. Frazier
*Assistant Examiner*—Rodney H. Bonck
*Attorney, Agent, or Firm*—Gilbert E. Alberding

[57] ABSTRACT

A device for maintaining at least a portion of a flexible conduit such as a water hose or the like in a predetermined fixed curvilinear position is disclosed herein and includes a shell or housing in the shape of, for example, a segment of a toroid having a top curvilinear section, a bottom curvilinear section and opposite side sections, all of which extend from one open end of the shell to an opposite open end thereof. An opening is located in one of the shell's side sections between the top and bottom sections thereof and extends the length of the shell so that a flexible conduit can be placed in the shell through the opening such that the conduit extends out the open ends. In this manner, the device, positioned around the side of the conduit, retains the latter in a fixed curvilinear fashion while, at the same time, providing a protective covering to the bottom curved portion of the conduit.

4 Claims, 3 Drawing Figures

PATENTED AUG 5 1975

3,897,923

INVENTORS
BRUCE A. PAEPKE
BY  BUDDY ZENT

Robert E Harris
ATTORNEY

CURVATURE MAINTAINING DEVICE

BACKGROUND OF THE INVENTION

1. Field of the Invention

This invention relates generally to article support or retaining devices and more particularly to a device for retaining a conduit or the like in a predetermined fixed curvilinear position.

2. Description of the Prior Art

It is well known that conduits such as water hoses and other such conveyance and support means are used in many diverse applications which require the capability of bending or otherwise contouring the conduits to conform with their respective intended uses. For example, a hose utilized in a conventional automobile engine must be bent or otherwise contoured to fit around and/or between adjacent stationary and/or moving parts, some of which are extremely hot, and yet sufficiently spaced from these parts so as not to obstruct operation thereof or be damaged thereby. As another example, a hose is often required for discharging water from a washing machine into an adjacent wash basin. In many cases, this requires the hose to be maintained in a bent position around the lip or rim of the basin so that the hose can be left unattended.

It should be readily apparent that it would be costly to manufacture conduits such as water hoses or other such conveyance and support tubes in a custom or individually contoured fashion for meeting the multitude of applications in which such conduits may be used. Accordingly, most of these items are presently constructed of flexible rubber or corrugated plastic or various standard sizes and shapes so that the potential user can, himself, contour or otherwise shape the conduit in a manner suitable for his particular intended use.

Heretofore, because of the advent of flexible conduits, there have been many suggested devices for retaining such items in desired bent or otherwise contoured positions. Most of these devices have taken the form of rigid retaining elements or combination of elements designed to engage the conduit on either the top or bottom side of the particular desired bend. It has been found, however, that most of these suggested devices are complex in design and/or expensive to manufacture, especially when considering the relatively low cost of the standard conduits, and therefore not completely satisfactory for their intended use. Further, in many cases, those devices positioned on the bottom side of the bent conduit have been found not to be completely reliable in retaining the conduits in a bent or contoured position. This is due, at least in part, to the fact that most of the internal force exerted by the conduit at its bending point is directed towards the open area, that is, away from the retaining device. On the other hand, most of those devices positioned on top of the conduit's bent or contoured segment require an initial precontouring of the tube before the latter can be retained by the device, making this a somewhat cumbersome task. In addition, with the device positioned in this manner, the bent conduit's bottom side, which is generally most susceptible to chaffing or other such damage, is left unprotected.

SUMMARY OF THE INVENTION

The present invention, which provides a heretofore unavailable improvement in curvature maintaining devices for flexible hoses and other such conduits, includes a precontoured curvilinear shell opened at opposite ends and defining an opening extending along one side between the opposite ends. The shell is adapted to receive through the opening a flexible hose or other similar item so that the latter extends out the aforesaid opposite ends. In this manner, the shell, which maintains at least a portion of the tube in a fixed curvilinear position, is located around the side of the curvilinear portion while, at the same time, protecting the underside of the curvilinear portion against chaffing or other such possible damage.

Accordingly, an object of the present invention is to provide a new and improved device for maintaining a hose, or other such conveyance or support conduit, in a fixed predetermined at least partially curvilinear position.

Another object of the present invention is to provide a new and improved curvature maintaining device which is uncomplicated in design, economical to manufacture and reliable in use.

Yet another object of the present invention is to provide a new and improved curvature maintaining device which is easily engagable with a flexible conduit for maintaining the latter in a predetermined curvilinear position.

Still another object of the present invention is to provide a new and improved curvature maintaining device which is adapted for protecting the underside of a conduit from chaffor other possible damage.

These and other objects and features of the present invention will become apparent from the following descriptions.

DETAILED DESCRIPTION

Figure 1:
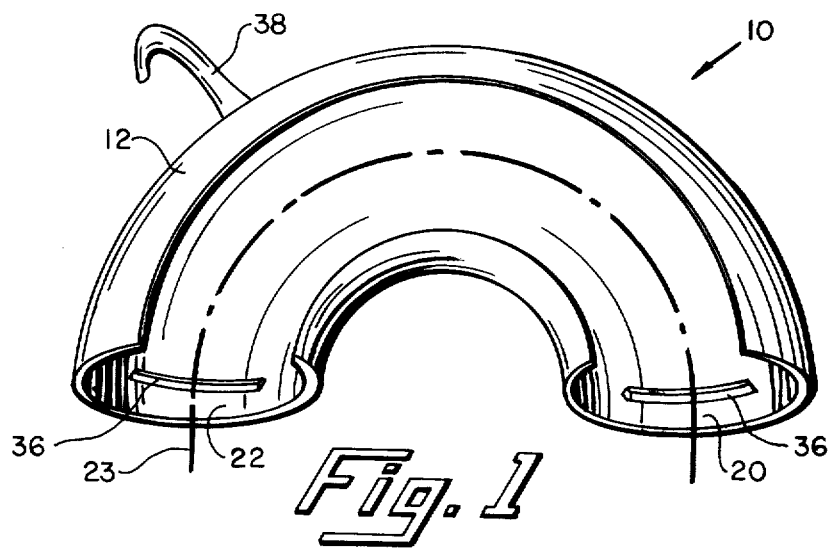
FIG. 1 is a perspective view of a curvature maintaining device constructed in accordance with the present invention.
Figure 2:
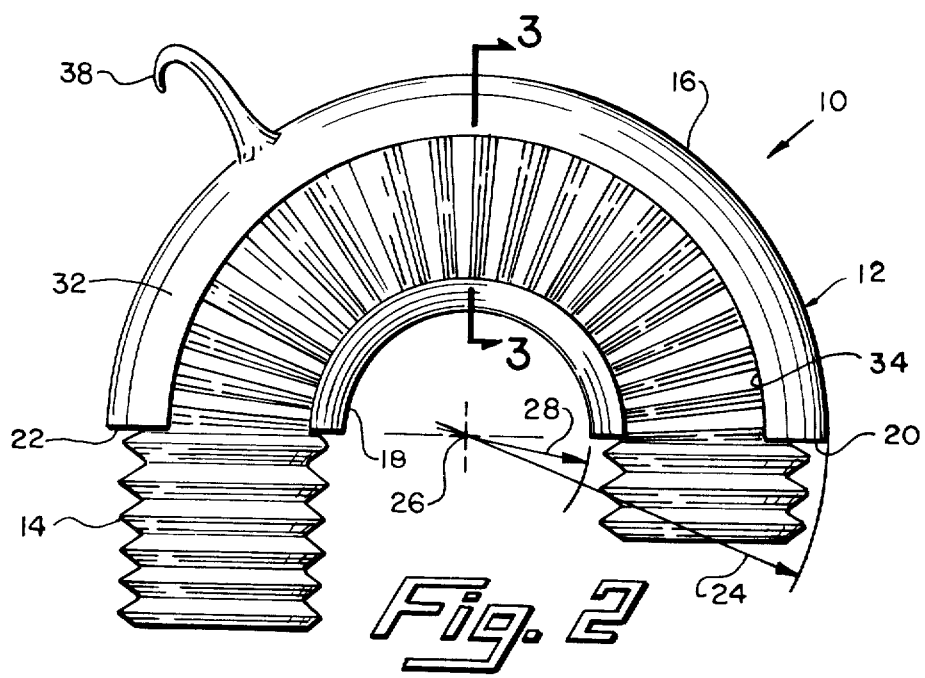
FIG. 2 is a side view of the curvature maintaining device of FIG. 1, showing a flexible hose retained therein.

Turning now to the drawings and particularly FIG. 1, a curvature maintaining device provided for holding or maintaining a flexible hose, tube or other such conveyance or support conduit in a fixed curvilinear position is illustrated and generally designated by the reference numeral 10. In accordance with a preferred embodiment of the present invention, device 10 is fashioned after a segment of a hollow torus defined by a shell or housing 12 adapted to receive and retain a conduit such as a flexible cylindrical hose 14 along the side of the hose so that the device maintains the latter in a curvilinear position, as illustrated in FIG. 2, while simultaneously protecting the underside of the hose's curvilinear portion against possible damage, as illustrated in FIG. 3.

The shell or housing, which is preferably an integral unit constructed of a relatively rigid material, must be capable of slight resilient movement so that the hose can be inserted therein. An example of such material is polypropylene. The shell includes a top curvilinear portion 16 and an aligned lower bottom curvilinear portion 18, both of which extend from one open end 20 of the shell to an opposite open end 22 along and on opposite sides of the shell's toroidal axis generally designated by the reference numeral 23 in FIG. 1. As viewed from its side (FIG. 2), the top portion of shell 12 defines an arc of a circle having a radius of curvature (designated by imaginary line 24) extending from a center point 26 while the bottom portion, which is preferably shorter in length than the top portion, defines an arc of a circle having a shorter radius of curvature (designated by imaginary line 28) extending from point 26. Hence, bottom portion 18 is positioned within the arc defined by top portion 16.

Figure 3:
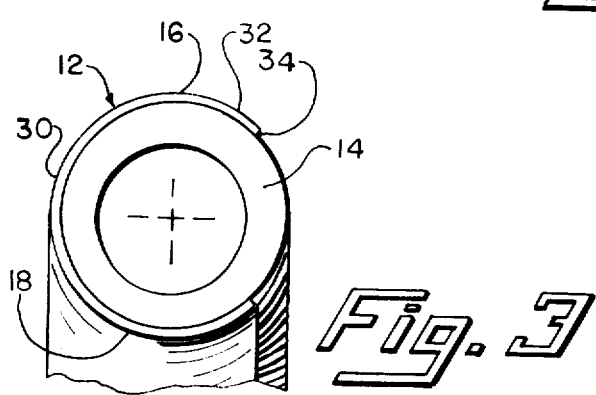
FIG. 3 is a cross-sectional view of the device of FIG. 1 taken along lines 3—3 in FIG. 2.

As illustrated best in FIG. 3, the top and bottom portions 16 and 18, respectively, of shell 12 are connected together by a first curvilinear side portion 30 which also extends between open ends 20 and 22. In addition, shell 12 includes a second side portion 32 positioned on the opposite side of the shell's toroidal axis as side portion 30 and, in accordance with the present invention, defines an elongated curvilinear opening 34 extending from open end 20 to open end 22 and substantially parallel with side portion 30.

As viewed in cross section (FIG. 3), that is, as viewed looking into a plane which passes through and perpendicular to the toroidal axis 23, the top and bottom portions 16 and 18 and side portions 30 and 32 of shell 12 define an arc of a circle extending from a top edge of opening 34 up and around the shell (taking the shortest path) to the lower edge of the opening. The radius defining this arc extends from the toroidal axis and is preferably slightly greater than the cross-sectional radius of hose 14. Hence, as will be seen hereinafter, the shell 12 is adapted to snuggly receive and substantially encircle that portion of the hose received in the shell.

From the foregoing description, attention is now directed to the manner in which device 10 maintains hose 14 in a fixed predetermined curvilinear position. Specifically, the hose, which is flexible and therefore easily bent, is inserted in a sideways manner, either all at once or in increments, through opening 34 and into shell 12 so that the hose axially extends out the opposite open ends 20 and 22. By placing or inserting the hose through opening 34 in increments, that is, small segments at a time, which is, for the most part, made possible due to the sideways position of opening 34, the hose does not have to be prebent or precontoured before insertion which, of course, facilitates insertion, especially when considering the relatively small size of the opening, as will be seen hereinafter.

Positioned in the foregoing manner, it should be readily apparent that the portion of hose 14 located in the shell is constrained in a curvilinear or bent position dependent upon the curvature of the shell and the segment of the torus which the latter represents. For example, in the embodiment illustrated, the shell 12 represents one-half of a torus and therefore provides a 180° bend in the hose. In this manner, for example, the discharge end of a flexible washing machine hose can be provided with a fixed 180° bend and placed, unattended, on the rim or lip of a basin for discharging purposes without requiring a permanent custom designed bend.

It should also be apparent that when the hose is inserted in the shell in the foregoing manner, the latter is positioned around a substantial portion of the hose and, in accordance with the present invention, provides for the opening 34 on the side of the bend. Hence, this not only facilitates loading or insertion as stated above, but also increases the shell's ability to hold the bend while minimizing the material or strength of material required in making up the shell. This is, for the most part, due to the fact that the forces exerted by the bend are directed upward and against the top portion 16 as opposed to the opening 34 which would otherwise be the case if the opening were positioned at the top of the bend. Furthermore, with the opening on the side, the hose is protected by bottom portion 18 against, for example, chaffing on the underside of its bend when the device 10 is used, for example, with a washing machine hose in the aforedescribed manner.

As stated above and as illustrated best in FIG. 3, the width of opening 34 is small compared to the diameter of hose 14. In fact, as illustrated, the opening only comprises approximately 90° of the cross-sectional circle defined by the torus-shaped shell 12. However, it should be understood that the width of the opening, in large part, depends upon the resiliency of the shell but, in any case, would be less than 180° of the cross-sectional circle.

Returning to FIG. 1, attention is directed to a pair of curvilinear ribs or shoulders 36 which may be provided with curvature maintaining device 10 and which are located near the open ends of shell 12. As illustrated in FIG. 1, the ribs, which are especially suitable when utilizing a corrugated hose, extend around the inner surface of the shell from the upper edge of opening 34 to its lower edge and are adapted to fit within adjacent pairs of convolutions of the corrugated hose when the latter is inserted in the shell. In this manner, the hose is prevented from axially slipping relative to shell 12. As a further feature which may be provided with device 10, a hook or other suitable means 38 may be fastened or otherwise connected with the outer surface of shell 12 and particularly to top portion 16, for supporting the device to an overhanging support (not shown).

As stated above, curvature maintaining device 10, when constructed in accordance with a preferred embodiment of the present invention, takes the form of or is fashioned after a segment of a torus. However, it should be understood that the form or shape of device 10 and particularly shell 12 will depend greatly upon the size and shape of the hose, or conduit generally, with which it is utilized as well as the necessary bend desired. For example, if the hose or conduit utilized displays an elliptical cross section, the shell 12 could be designed to take the shape of a toroid, generally, displaying a similar cross-section configuration. In addition, if, for example, a sharper or more abrupt bend were desired, the shell could be appropriately designed in accordance with this desire. In any case, however, the conduit insertion opening 34 would be located on the side of the bend so as to achieve the aforedescribed advantages.

Although a single embodiment of the present invention has been illustrated and described, it is anticipated that various changes and modifications will be apparent to those skilled in the art, and such changes may be made without departing from the scope of the invention as defined by the following claims.

What is claimed is:

1. A device adapted for maintaining at least a portion of a flexible conduit in a predetermined fixed curvilinear position, said device comprising a hollow shell open at opposite ends and having a top section positioned between said opposite open ends and defining a top curvilinear path having a curvature greater than 90°, a bottom section positioned between said opposite open ends and defining a bottom curvilinear path having a curvature complimentary to that of said top curvilinear path, said bottom section being positioned within said top curvilinear path, and opposite side sections extending between said opposite open ends, at least one of said side sections connecting said top section with said bottom section and the other of said side sections defining an opening positioned between said top section and said bottom section, whereby said shell is adapted to receive through said opening at least a portion of a flexible conduit so that at least a portion of the latter is held in a fixed curvilinear position determined by the curvature of said top and bottom sections of said device.

2. A device according to claim 1 wherein said top and bottom sections define top and bottom curvilinear paths, respectively, having a curvature substantially equal to 180°.

3. A device adapted for maintaining at least a portion of a flexible conduit in a fixed curvilinear position, said device comprising a shell fashioned after a segment of a toroid having opposite open ends, a top curvilinear portion extending between said opposite open ends, the curvature of said top portion between said opposite open ends being substantially equal to 180° and having a first predetermined radius of curvature, a bottom curvilinear portion positioned below said top portion and extending between said opposite open ends, the curvature of said bottom portion between said opposite open ends being complimentary to the curvature of said top portion and having a second predetermined radius of curvature shorter in length than said first radius of curvature, and opposite side portions extending between said open ends, at least one of said side portions connecting said top portion with said bottom portion and the other side portion having an opening positioned between said top and bottom portions whereby said shell is adapted to receive through said opening at least a portion of a flexible conduit so that at least a portion of the latter is held in a fixed curvilinear position determined by the curvature of said top and bottom portions of said device.

4. A device according to claim 3 including shoulder means connected with and extending radially inwardly from the inner surface of said shell and adapted for engaging said conduit when the latter is received within said shell.

* * * * *